US012489367B2

(12) United States Patent
Ke

(10) Patent No.: US 12,489,367 B2
(45) Date of Patent: Dec. 2, 2025

(54) SWITCH TRIGGER FOR SUPPRESSING INRUSH CURRENT

(71) Applicant: Delta Electronics, Inc., Taoyuan (TW)

(72) Inventor: Ming-Yang Ke, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 308 days.

(21) Appl. No.: 18/376,363

(22) Filed: Oct. 3, 2023

(65) Prior Publication Data

US 2025/0062689 A1 Feb. 20, 2025

(30) Foreign Application Priority Data

Aug. 18, 2023 (CN) ......................... 202311044893.5

(51) Int. Cl.
*H02M 3/158* (2006.01)
*H02M 1/088* (2006.01)
*H02M 1/32* (2007.01)

(52) U.S. Cl.
CPC ........... *H02M 3/158* (2013.01); *H02M 1/088* (2013.01); *H02M 1/325* (2021.05)

(58) Field of Classification Search
CPC .............................. H02M 1/088; H02M 1/325
USPC .......................................................... 323/282
See application file for complete search history.

(56) References Cited

U.S. PATENT DOCUMENTS 4,956,563 A 9/1990 Schornack
6,335,654 B1 1/2002 Cole
11,128,130 B2 9/2021 Luo et al.
11,381,234 B2 7/2022 Ikeda
11,539,205 B2 12/2022 Kim et al.
2007/0252565 A1 11/2007 Wang et al.
2007/0268048 A1 11/2007 Komatsu et al.
2013/0200876 A1* 8/2013 Lu .......................... H02M 1/36 323/311
2019/0007040 A1 1/2019 Davila et al.
2020/0014294 A1 1/2020 Song et al.
(Continued)

FOREIGN PATENT DOCUMENTS

CN 100561816 C 11/2009
CN 101694938 A 4/2010
CN 101976945 A 2/2011
(Continued)

*Primary Examiner* — Yemane Mehari
(74) *Attorney, Agent, or Firm* — KIRTON McCONKIE; Evan R. Witt

(57) ABSTRACT

A switch trigger is provided. The switch trigger includes input and output terminals, first and second switches, a bypass resistor, an output capacitor, a diode, a discharging resistor, and first and second divider resistors. The first switch has two terminals respectively and electrically connected to the input and output terminals. The bypass resistor is electrically connected to the input and output terminals. The diode has an anode electrically connected to the input terminal. The second switch has two terminals respectively and electrically connected to a cathode of the diode and a third terminal of the first switch. The discharging resistor is electrically connected to the third terminal of the first switch and the ground terminal. The first and second divider resistors are electrically connected in series between the output and ground terminals, and a connection node therebetween is electrically connected to a third terminal of the second switch.

14 Claims, 8 Drawing Sheets

(56) References Cited

U.S. PATENT DOCUMENTS

| | | | |
|---|---|---|---|
| 2020/0343718 | A1 | 10/2020 | Chan |
| 2020/0365346 | A1 | 11/2020 | Telefus et al. |

FOREIGN PATENT DOCUMENTS

| | | | | | |
|---|---|---|---|---|---|
| CN | 204559384 | U | | 8/2015 | |
| CN | 106981979 | A | | 7/2017 | |
| CN | 109417355 | A | | 3/2019 | |
| CN | 106684961 | B | | 7/2019 | |
| CN | 210577795 | U | | 5/2020 | |
| CN | 110024250 | B | | 11/2021 | |
| CN | 114270647 | A | | 4/2022 | |
| CN | 115276625 | A | | 11/2022 | |
| CN | 217904263 | U | | 11/2022 | |
| EP | 2797218 | A1 | | 10/2014 | |
| EP | 2933909 | A1 | * | 10/2015 | .............. H02M 1/34 |
| EP | 3679644 | B1 | | 9/2021 | |
| JP | H06196277 | A | | 7/1994 | |
| JP | H11289657 | A | | 10/1999 | |
| JP | 2012157146 | A | | 8/2012 | |
| JP | 2015215573 | A | | 12/2015 | |
| TW | 200601673 | A | | 1/2006 | |
| TW | 200849782 | A | | 12/2008 | |
| TW | 1721748 | B | | 3/2021 | |
| WO | 2020236726 | A1 | | 11/2020 | |
| WO | 2021026519 | A1 | | 2/2021 | |

* cited by examiner

SWITCH TRIGGER FOR SUPPRESSING INRUSH CURRENT

CROSS-REFERENCE TO RELATED APPLICATION

This application claims priority to China Patent Application No. 202311044893.5 filed on Aug. 18, 2023. The entire contents of the above-mentioned patent applications are incorporated herein by reference for all purposes.

FIELD OF THE INVENTION

The present disclosure relates to a switch trigger, and more particularly to a switch trigger for suppressing an inrush current.

BACKGROUND OF THE INVENTION

A conventional switch control method may suppress inrush current by soft start of switches. However, since a duration for turning on the switch increases, the switch must bear more heat losses, which not only reduces an efficiency but also makes the switch more susceptible to damage. In addition, as the duration for turning on the switch increases, a duration for turning off the switch also increases. Therefore, the longer duration for turning off the switch may cause the switch unable to be turned off immediately for implementing protection.

Therefore, there is a need of providing a switch trigger in order to overcome the drawbacks of the conventional technologies.

SUMMARY OF THE INVENTION

The present disclosure provides a switch trigger which reduces a voltage variation while turning on a switch by precharge, thereby suppressing an inrush current. Consequently, the problems like efficiency reduction, switch damage, and an inability to turn off the switch immediately while triggering the protection, which are caused by the increased duration for switching the switch in conventional approach, are avoided. Moreover, in the present disclosure, the switch trigger is able to realize zero-voltage switching and has a function of short circuit protection.

In accordance with an aspect of the present disclosure, a switch trigger is provided. The switch trigger includes an input terminal, an output terminal, a first switch, a bypass resistor, an output capacitor, a diode, a second switch, a discharging resistor, a first divider resistor, and a second divider resistor. The first switch has a first terminal and a second terminal respectively and electrically connected to the input terminal and the output terminal. The bypass resistor has two terminals respectively and electrically connected to the input terminal and the output terminal. The output capacitor has two terminals respectively and electrically connected to the output terminal and a ground terminal. The diode has an anode electrically connected to the input terminal. The second switch has a first terminal and a second terminal respectively and electrically connected to a cathode of the diode and a third terminal of the first switch. The discharging resistor has two terminals respectively and electrically connected to the third terminal of the first switch and the ground terminal. The first divider resistor and the second divider resistor are electrically connected in series between the output terminal and the ground terminal, and a connection node between the first divider resistor and the second divider resistor is electrically connected to a third terminal of the second switch.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
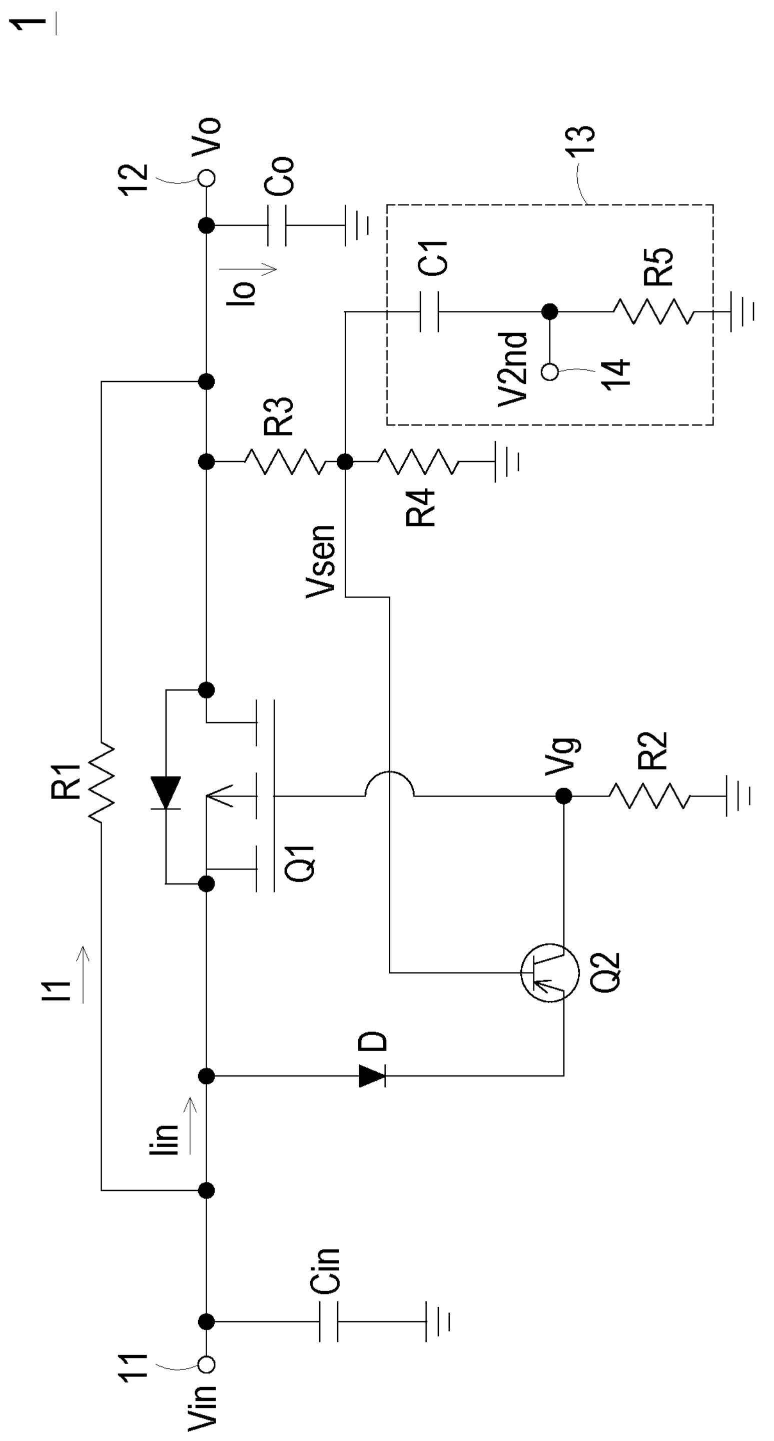
FIG. 1 is a schematic circuit diagram illustrating a switch trigger according to a first embodiment of the present disclosure.

FIG. 1 is a schematic circuit diagram illustrating a switch trigger according to a first embodiment of the present disclosure. As shown in FIG. 1, the switch trigger 1 includes an input terminal 11, an output terminal 12, a first switch Q1, a bypass resistor R1, an output capacitor Co, a diode D, a second switch Q2, a discharging resistor R2, a first divider resistor R3, a second divider resistor R4, an input capacitor Cin, and a back-stage detection circuit 13. The first divider resistor R3 and the second divider resistor R4 form a voltage divider.

Structurally, the input terminal 11 is configured to receive an input voltage Vin, and the output terminal 12 is configured to provide an output voltage Vo. First and second terminals of the first switch Q1 are electrically connected to the input terminal 11 and the output terminal 12, respectively. Two terminals of the bypass resistor R1 are electrically connected to the input terminal 11 and the output terminal 12, respectively. Two terminals of the output capacitor Co are electrically connected to the output terminal 12 and a ground terminal, respectively. An anode of diode D is electrically connected to the input terminal 11, and the diode D is configured to prevent current backflow. First and second terminals of the second switch Q2 are electrically connected to a cathode of the diode D and a third terminal of the first switch Q1, respectively. Two terminals of the discharging resistor R2 are electrically connected to the third terminal of the first switch Q1 and the ground terminal, respectively. The first divider resistor R3 and the second divider resistor R4 are electrically connected in series between the output terminal 12 and the ground terminal. The first divider resistor R3 and the second divider resistor R4 are respectively coupled to the output terminal 12 and the ground terminal, and a connection node between the first divider resistor R3 and the second divider resistor R4 is electrically connected to a third terminal of the second switch Q2. Two terminals of the input capacitor Cin are respectively and electrically connected to the input terminal 11 and the ground terminal, and the input capacitor is configured for decoupling.

In operation, when initially power up, the first switch Q1 turns off, and the input voltage Vin charges the output capacitor Co through the bypass resistor R1 to gradually increase the output voltage Vo at the output terminal 12. At the same time, the second switch Q2 turns on so that the input voltage Vin builds up a voltage Vg across the discharging resistor R2. Afterwards, the first divider resistor R3 and the second divider resistor R4 divide the output voltage Vo to generate the voltage Vsen. When the voltage Vsen increases to a threshold sufficient to turn off the second switch Q2, the voltage Vg is discharged to the ground terminal through the discharging resistor R2, which causes the first switch Q1 to turn on. As the first switch Q1 turns on, the input voltage Vin is transmitted to the output terminal 12 to serve as the output voltage Vo.

It is noted that the voltage at the output terminal 12 has already been increased by charging the output capacitor Co through the bypass resistor R1. Therefore, when the first switch Q1 turns on, a voltage difference between the input terminal 11 and the output terminal 12 has been reduced already, and thus the inrush current caused by a large voltage difference is prevented. Further, as the voltage at the output terminal 12 gradually increases, a voltage at the second terminal of the first switch Q1 also increases gradually. When the first switch Q1 turns on, a voltage difference between the first and second terminals of first switch Q1 has been reduced already. Accordingly, the inrush current is suppressed, and a body diode of the switch Q1 is prevented from being damaged by an induced electromotive force generated due to Faraday's law of electromagnetic induction.

The switch trigger 1 further includes a back-stage detection circuit 13 electrically connected to the voltage divider. The back-stage detection circuit 13 is configured to provide a back-stage voltage V2nd to the voltage Vsen for adjusting a duration for turning on the first switch Q1. The back-stage detection circuit 13 includes a detection capacitor C1, a detection resistor R5, and a detection terminal 14. Two terminals of the detection capacitor C1 are electrically connected to the third terminal of the second switch Q2 and the detection terminal 14, respectively. Two terminals of the detection resistor R5 are electrically connected to the detection terminal 14 and the ground terminal, respectively. The detection terminal 14 is configured to detect an output voltage of a back-stage converter. For example, when the output terminal 12 is electrically connected to the back-stage converter (not shown), the back-stage converter converts the output voltage Vo provided by the switch trigger 1 at the output terminal 12 into the back-stage voltage V2nd. The detection terminal 14 is electrically connected to the back-stage voltage V2nd to detect the output voltage of the back-stage converter. The back-stage voltage V2nd causes an instant voltage across the detection capacitor C1 and meanwhile changes the voltage Vsen. As a result, a turn-off timing of the second switch Q2 is advanced, which advances a turn-on timing of the first switch Q1.

In multi-level power conversion systems, the switch trigger may be disposed in a first-stage power protector to prevent the inrush current when the power supply is powering up. In order to expedite a power-up process of the entire system, as soon as the output voltage Vo reaches to a reference voltage (e.g., 80% or 90% of the input voltage Vin), the back-stage converter begins to draw the output voltage Vo to perform voltage conversion. Therefore, it is necessary to advance the turn-on timing of the first switch Q1 to provide the enough output voltage Vo for the back-stage converter to operate normally.

In the first embodiment, the first switch Q1 may be a P-type MOSFET (metal-oxide-semiconductor field effect transistor), and the first, second and third terminals of the first switch Q1 are a source, drain and gate, respectively. The second switch Q2 may be a P-type BJT (bipolar junction transistor), and the first, second and third terminals of the second switch Q2 are an emitter, collector and base, respectively.

Figure 2:
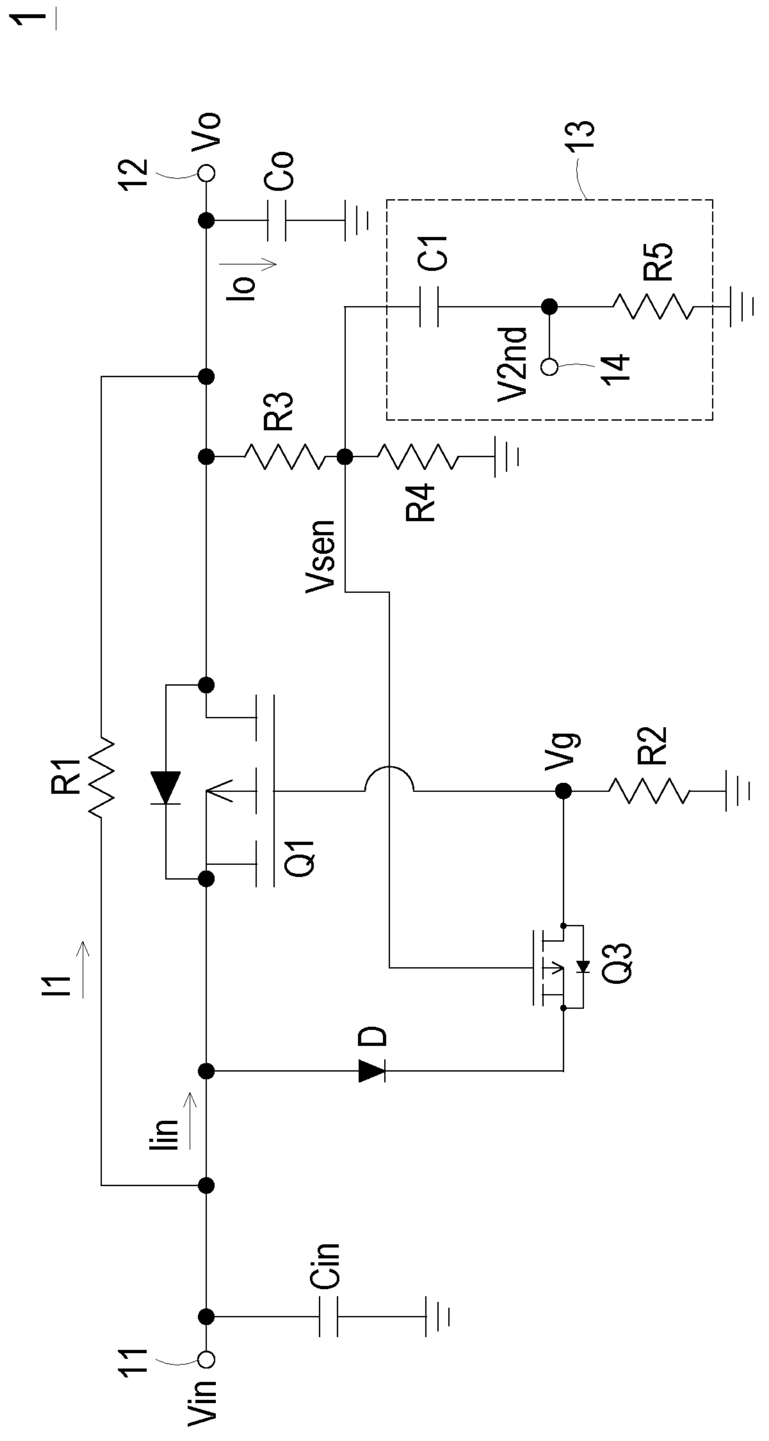
FIG. 2 is a schematic circuit diagram illustrating a switch trigger according to a second embodiment of the present disclosure.

FIG. 2 is a schematic circuit diagram illustrating a switch trigger according to a second embodiment of the present disclosure. In FIG. 2, a second switch Q3 replaces the second switch Q2 of FIG. 1. The second switch Q3 is a P-type MOSFET, and first, second and third terminals of the second switch Q3 are a source, a drain and a gate, respectively.

Figure 3A:
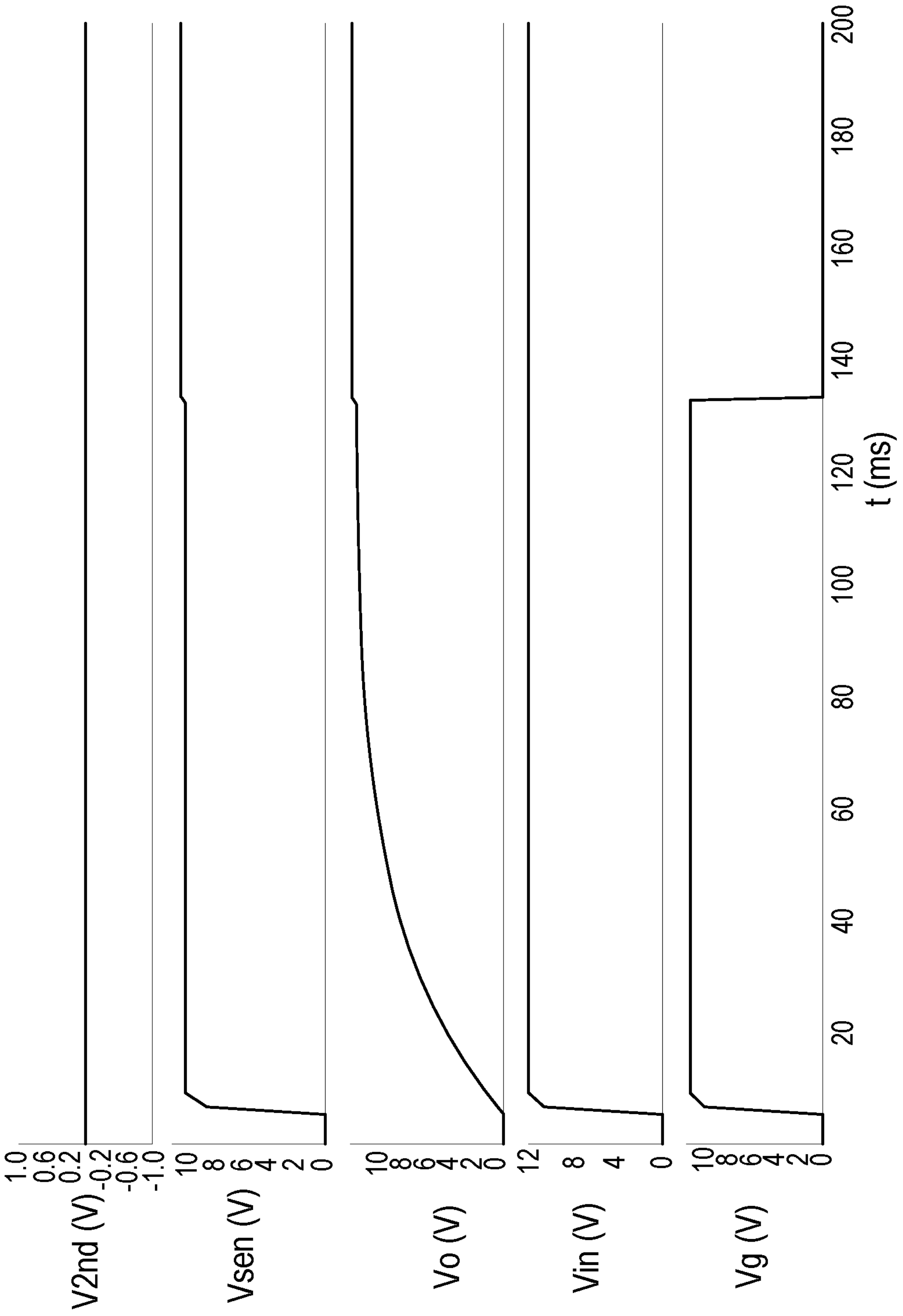
FIG. 3A and FIG. 3B exemplify the key voltage and current waveforms of the switch trigger of FIG. 1 while realizing the inrush current suppression.
Figure 3B:
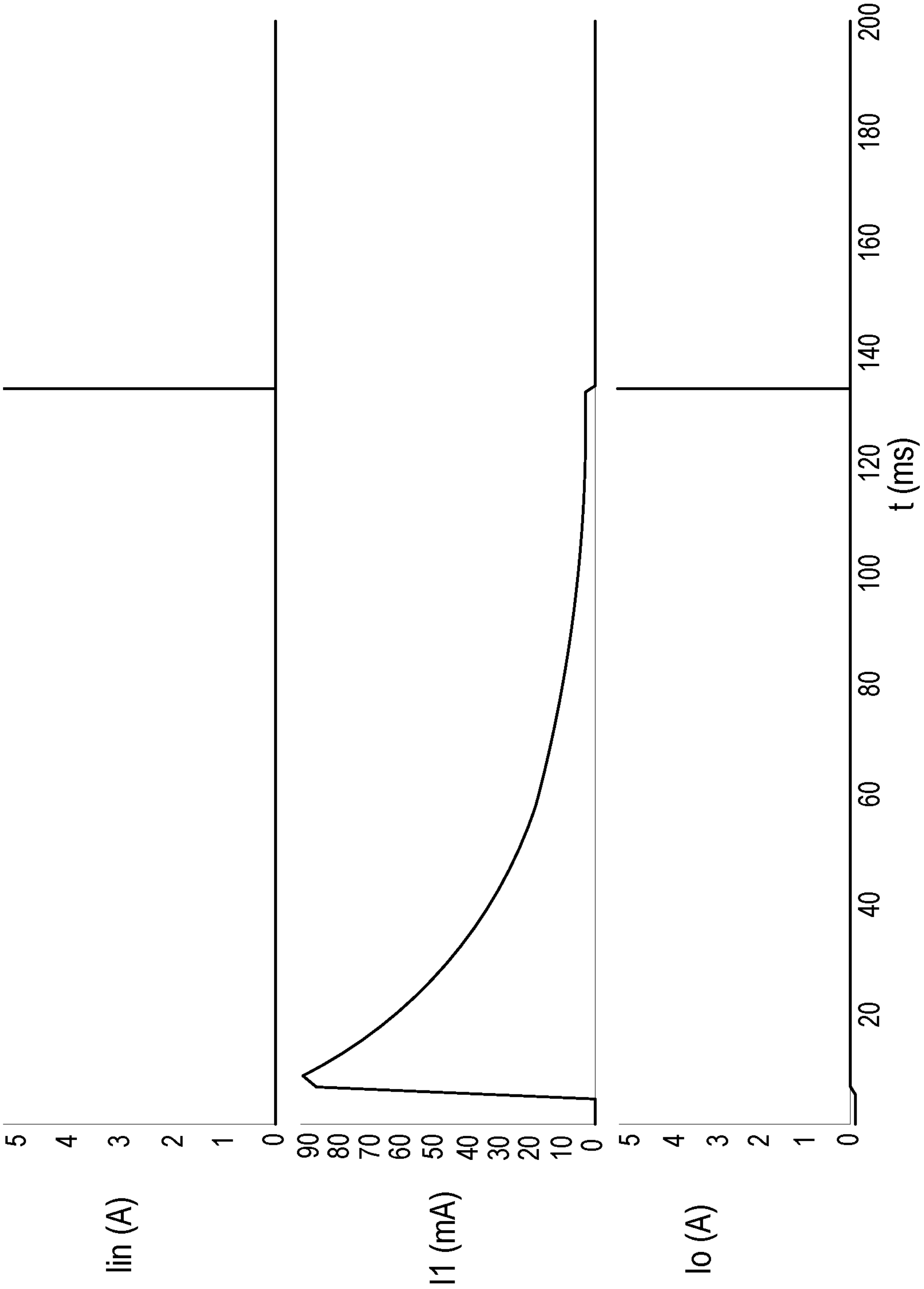

Please refer to FIG. 1, FIG. 3A and FIG. 3B. FIG. 3A and FIG. 3B exemplify the key voltage and current waveforms of the switch trigger 1 of FIG. 1 while realizing the inrush current suppression. In FIG. 3A, Vg represents the voltage at the third terminal of the first switch Q1, and Vsen represents the voltage at the third terminal of the second switch Q2. In FIG. 3B, Iin, I1 and Io represent currents flowing through the first switch Q1, the bypass resistor R1 and the output capacitor Co, respectively. As shown in FIG. 1, FIG. 3A and FIG. 3B, when the input terminal 11 starts to receive the input voltage Vin (i.e., the input voltage Vin increases), the input voltage Vin is provided to the second switch Q2 through the diode D. At this time, the second switch Q2 is in an on state, resulting in a high level of the voltage Vg at the third terminal of the first switch Q1, and the first switch Q1 is in an off state. Under this circumstance, the input voltage Vin charges the output capacitor Co through the bypass resistor R1, thereby gradually increasing the output voltage Vo across the output capacitor Co. When the output voltage Vo is lower than the threshold voltage, the first switch Q1 remains in the off state, the second switch Q2 remains in the on state, and the output capacitor Co is charged continuously to increase the output voltage Vo gradually. When the output voltage Vo reaches to the threshold voltage, the second switch Q2 turns off, the voltage Vg at the third terminal of the first switch Q1 is discharged to zero through the discharging resistor R2, and the first switch Q1 turns on. Accordingly, the input voltage Vin is provided to the output terminal 12 through the first switch Q1. It is noted that a person skilled in the art may choose resistance values of the first divider resistor R3 and the second divider resistor R4 according to practical requirements. By changing the resistance values of the first divider resistor R3 and the second divider resistor R4, the turn-off timing of the second switch Q2 is determined. Additionally, in this embodiment, the back-stage converter is not in operation, and thus the back-stage voltage V2nd is fixed at zero.

Consequently, zero-voltage turn-on for the first switch Q1 is realized, and thus the switch loss is reduced. Further, since the output voltage Vo is already at a higher level when the first switch Q1 turns on, the voltage variation is decreased and the inrush current is reduced, thereby realizing inrush current suppression.

Figure 4A:
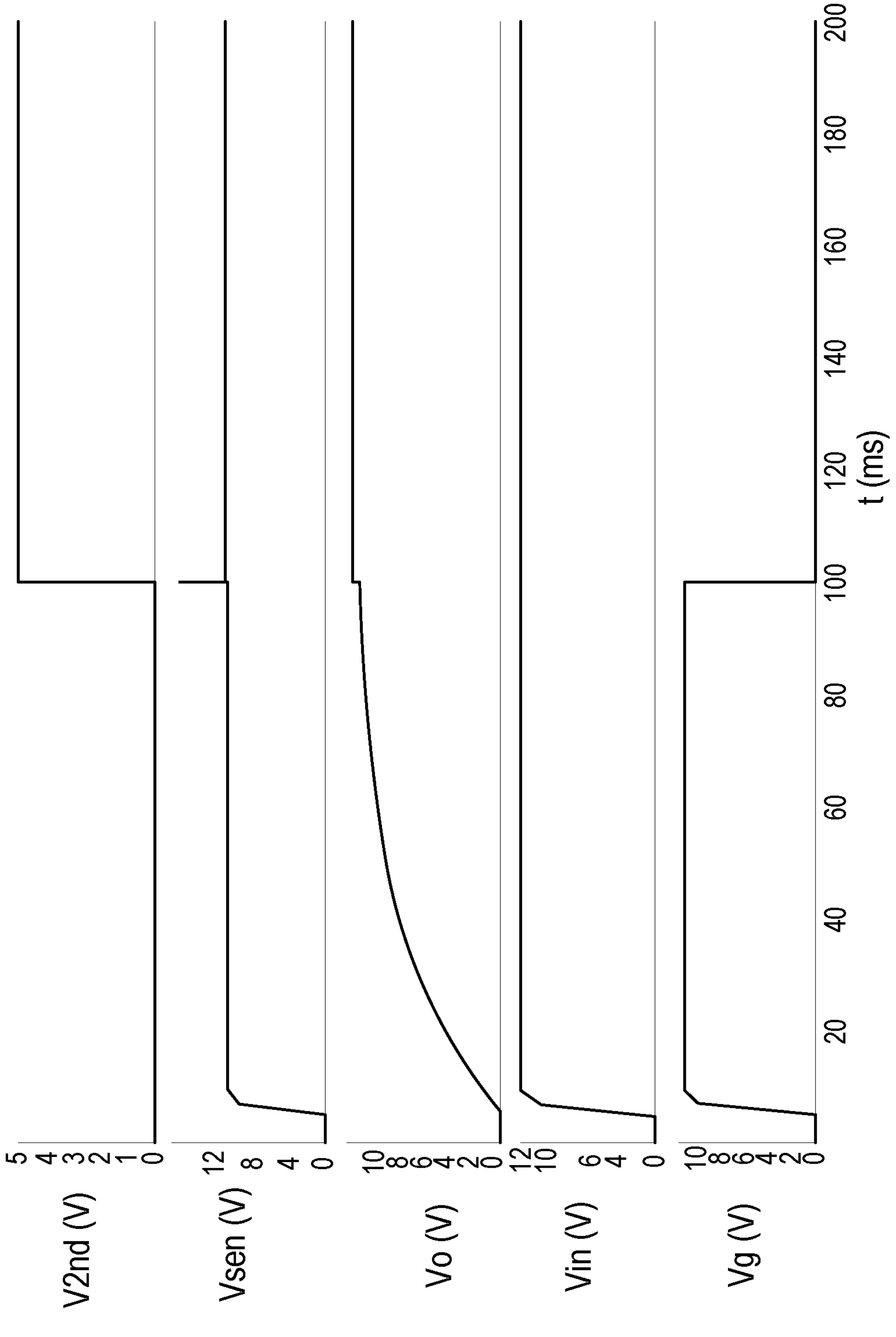
FIG. 4A and FIG. 4B exemplify the key voltage and current waveforms of the switch trigger of FIG. 1 while advancing the turn-on timing of the first switch for corresponding the operation of the back-stage converter.
Figure 4B:
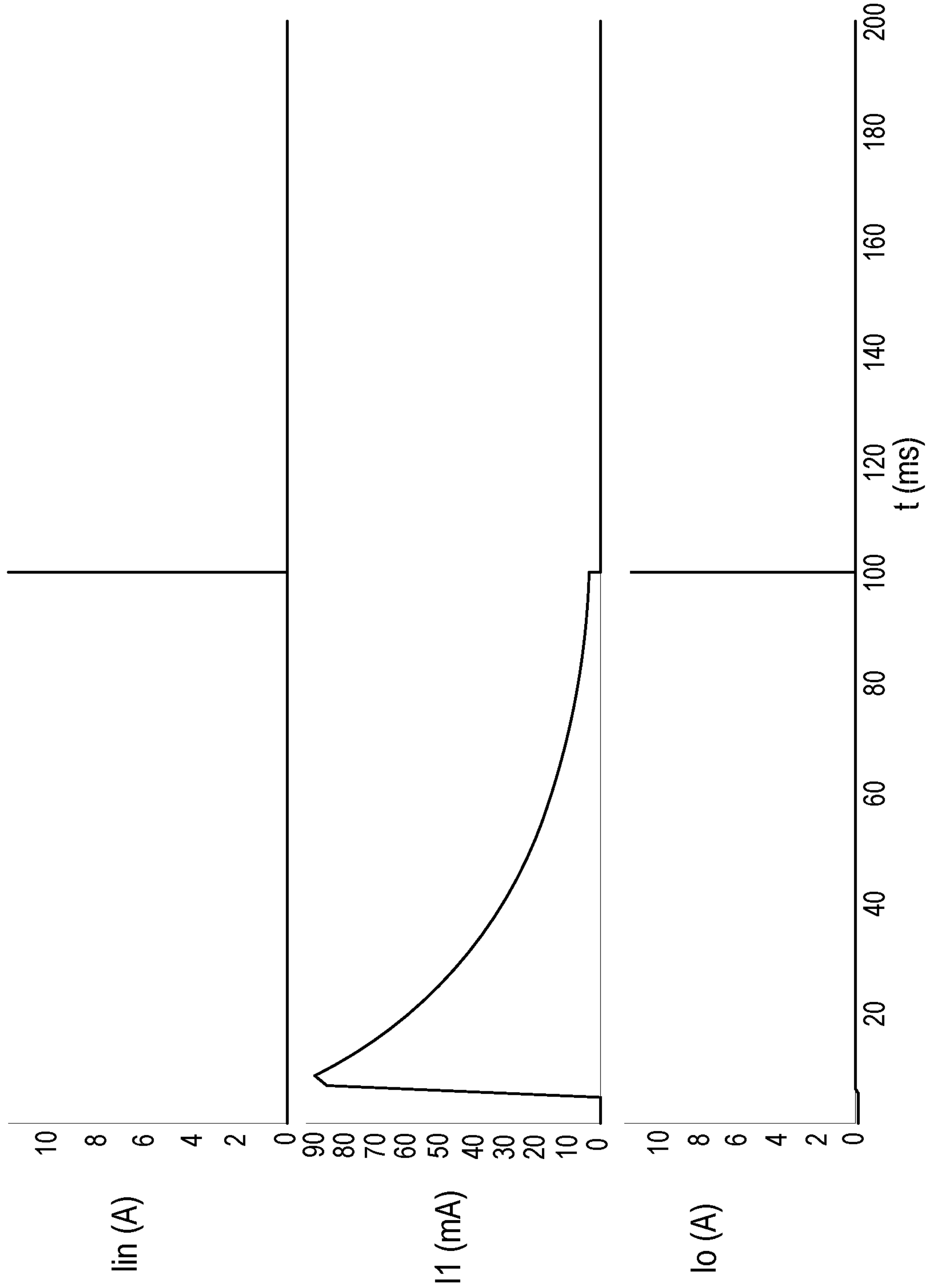

Please refer to FIG. 1, FIG. 4A and FIG. 4B. FIG. 4A and FIG. 4B exemplify the key voltage and current waveforms of the switch trigger 1 of FIG. 1 while advancing the turn-on timing of the first switch Q1 for corresponding the operation of the back-stage converter. As shown in FIG. 1, FIG. 4A and FIG. 4B, when the input terminal 11 starts to receive the input voltage Vin (i.e., the input voltage Vin increases), the second switch Q2 is in the on state, and the first switch Q1 is in the off state. Under this circumstance, the input voltage Vin charges the output capacitor Co through the bypass resistor R1, thereby gradually increasing the output voltage Vo across the output capacitor Co. When the output voltage Vo reaches to the reference voltage, the back-stage converter converts the output voltage Vo into the back-stage voltage V2nd. The back-stage voltage V2nd is transmitted to the third terminal of the second switch Q2 through the back-stage detection circuit 13, and the voltage Vsen at the third terminal of the second switch Q2 is increased by the back-stage voltage V2nd and triggers the second switch Q2 to turn off. Afterwards, the voltage Vg at the third terminal of the first switch Q1 is discharged to zero through the discharging resistor R2, and the first switch Q1 turns on. Accordingly, the input voltage Vin is provided to the output terminal 12 through the first switch Q1. The reference voltage is usually lower than the threshold voltage. Therefore, compared with the embodiment shown in FIG. 3A and FIG. 3B, in this embodiment, the turn-off timing of the second switch Q2 is advanced due to the operation of the back-stage converter, and thus the turn-on timing of the first switch Q1 is advanced as well. Electric energy is provided to the back-stage converter through the first switch Q1 such that the back-stage converter is able to operate stably. As an example, the reference voltage is equal to 80% or 90% of the input voltage Vin, but not limited thereto.

Figure 5A:
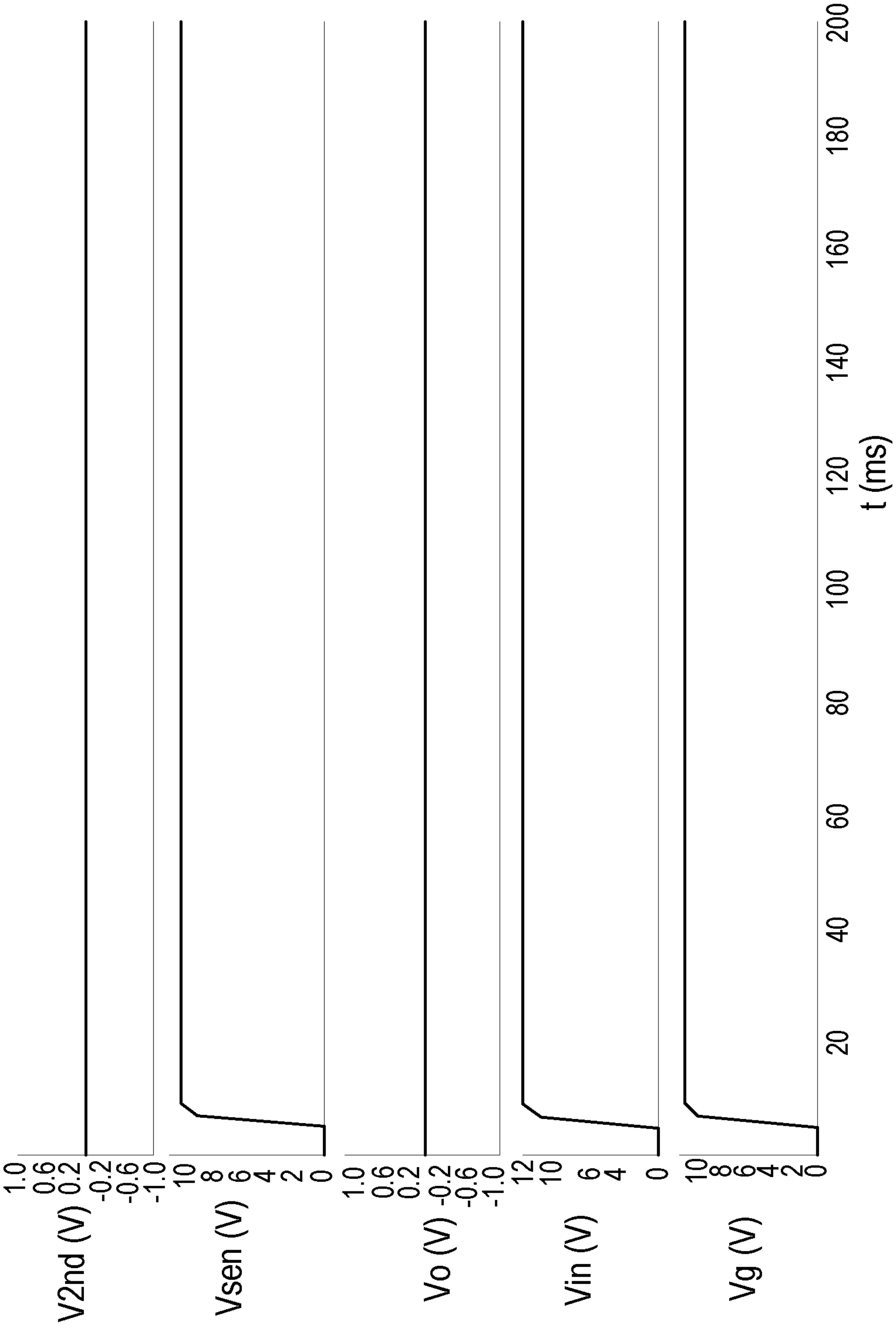
FIG. 5A and FIG. 5B exemplify the key voltage and current waveforms of the switch trigger of FIG. 1 while implementing the short-circuit protection for the short circuit occurring at the output.
Figure 5B:
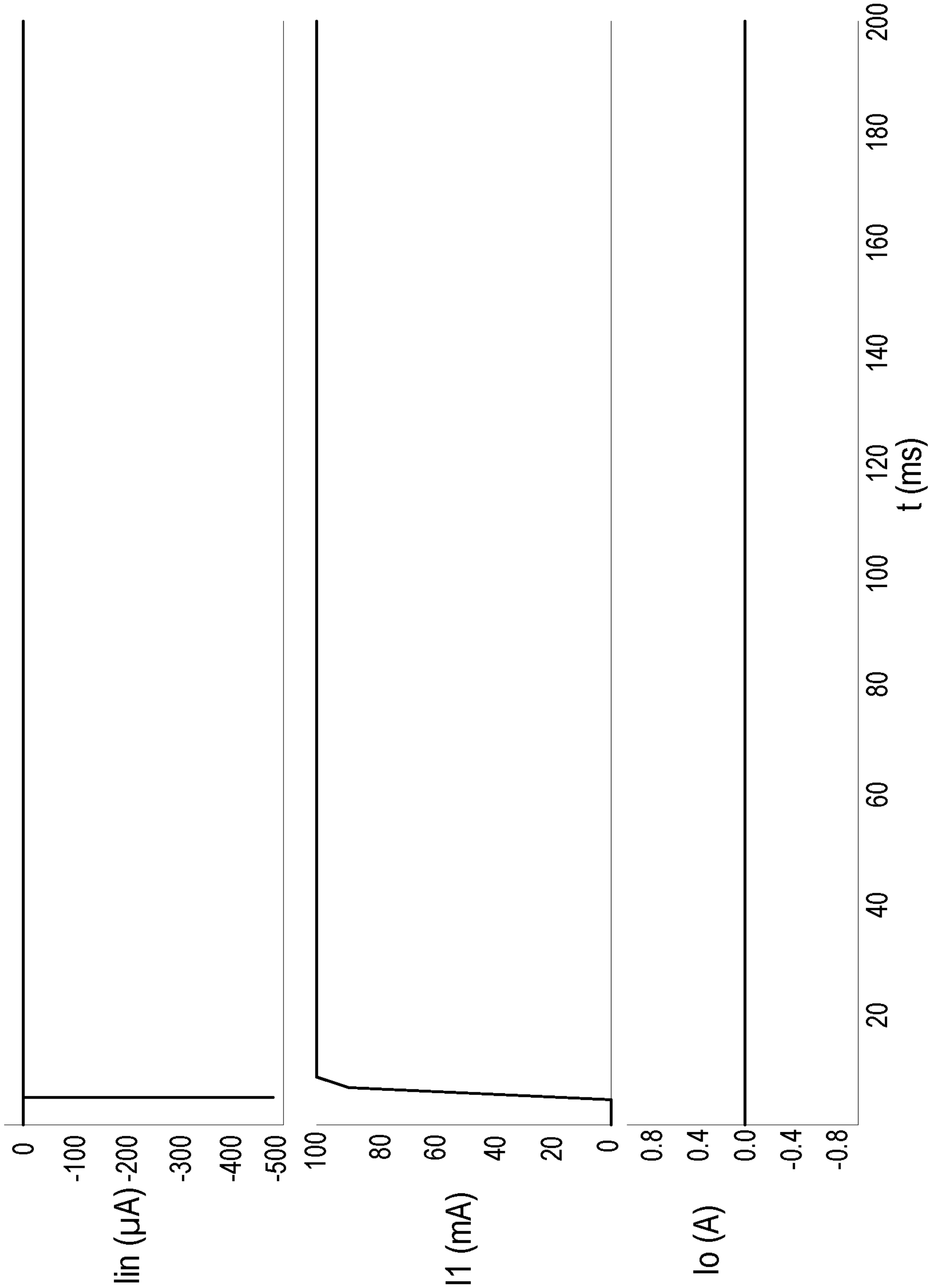

Please refer to FIG. 1, FIG. 5A and FIG. 5B. FIG. 5A and FIG. 5B exemplify the key voltage and current waveforms of the switch trigger 1 of FIG. 1 while implementing the short-circuit protection for the short circuit occurring at the output. As shown in FIG. 1, FIG. 5A and FIG. 5B, when the input terminal 11 receives the input voltage Vin and the output terminal 12 is short-circuited to the ground terminal, the output voltage Vo becomes zero, the second switch Q2 remains in the on state, and the voltage Vg at the third terminal of first switch Q1 remains at the high level. As a result, the first switch Q1 remains in the off state and would not be triggered to turn on, and thus the short-circuit protection is achieved.

In summary, the present disclosure provides a switch trigger which reduces the voltage variation while turning on the switch by precharge, thereby suppressing the inrush current. Consequently, the problems like efficiency reduction, switch damage, and the inability to turn off the switch immediately while triggering the protection, which are caused by the increased time for switching the switch in conventional approach, are avoided. Moreover, in the present disclosure, the switch trigger is able to realize zero-voltage switching and has the function of short circuit protection. Further, the switch trigger can ensure the stable output of the back-stage converter.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switch trigger, comprising:

an input terminal and an output terminal;

a first switch having a first terminal and a second terminal respectively and electrically connected to the input terminal and the output terminal;

a bypass resistor having two terminals respectively and electrically connected to the input terminal and the output terminal;

an output capacitor having two terminals respectively and electrically connected to the output terminal and a ground terminal;

a diode having an anode electrically connected to the input terminal;

a second switch having a first terminal and a second terminal respectively and electrically connected to a cathode of the diode and a third terminal of the first switch;

a discharging resistor having two terminals respectively and electrically connected to the third terminal of the first switch and the ground terminal; and a first divider resistor and a second divider resistor, electrically connected in series between the output terminal and the ground terminal, wherein a connection node between the first divider resistor and the second divider resistor is electrically connected to a third terminal of the second switch.

2. The switch trigger according to claim 1, wherein, when the input terminal receives an input voltage, the first switch is in an off state, the second switch is in an on state, the input voltage charges the output capacitor through the bypass resistor for increasing the output voltage across the output capacitor.

3. The switch trigger according to claim 2, wherein, when the output voltage increases to reach to a threshold voltage, the second switch turns off, a voltage at the third terminal of the first switch is discharged to zero through the discharging resistor so that the first switch turns on, and the input voltage is provided to the output terminal through the first switch.

4. The switch trigger according to claim 1, further comprising a back-stage detection circuit which comprises:

a detection terminal electrically connected to a back-stage voltage, wherein the output terminal is electrically connected to a back-stage converter, and the back-stage converter is configured to convert the output voltage provided by the output terminal into the back-stage voltage;

a detection capacitor having two terminals respectively and electrically connected to the third terminal of the second switch and the detection terminal; and a detection resistor having two terminals respectively and electrically connected to the detection terminal and the ground terminal.

5. The switch trigger according to claim 4, wherein, when the input terminal receives an input voltage, the first switch is in an off state, the second switch is in an on state, the input voltage charges the output capacitor through the bypass resistor for increasing the output voltage across the output capacitor.

6. The switch trigger according to claim 5, wherein, when the output voltage increases to reach to a reference voltage, the back-stage converter converts the output voltage into the back-stage voltage, the back-stage voltage triggers the second switch to turn off through the back-stage detection circuit, a voltage at the third terminal of the first switch is discharged to zero through the discharging resistor so that the first switch turns on, and the input voltage is provided to the output terminal through the first switch.

7. The switch trigger according to claim 6, wherein the reference voltage is equal to 80% or 90% of the input voltage.

8. The switch trigger according to claim 5, wherein the back-stage voltage generates an instant voltage across the detection capacitor, and the instant voltage changes a voltage at the third terminal of the second switch so that a turn-off timing of the second switch is advanced, which advances a turn-on timing of the first switch.

9. The switch trigger according to claim 1, wherein resistance values of the first divider resistor and the second divider resistor are selectable and are utilized to determine a turn-off timing of the second switch.

10. The switch trigger according to claim 1, wherein the first switch is a P-type metal-oxide-semiconductor field effect transistor, and the first terminal, the second terminal and the third terminal of the first switch are a source, a drain and a gate, respectively.

11. The switch trigger according to claim 1, wherein the second switch is a bipolar junction transistor, and the first terminal, the second terminal and the third terminal of the second switch are an emitter, a collector and a base, respectively.

12. The switch trigger according to claim 1, wherein the second switch is a P-type metal-oxide-semiconductor field effect transistor, and the first terminal, the second terminal and the third terminal of the second switch are a source, a drain and a gate, respectively.

13. The switch trigger according to claim 1, further comprising an input capacitor, wherein two terminals of the input capacitor are respectively and electrically connected to the input terminal and the ground terminal, and the input capacitor is configured for decoupling.

14. The switch trigger according to claim 1, wherein, when the input terminal receives an input voltage and the output terminal is short-circuited to the ground terminal, the output voltage becomes zero, the second switch remains in an on state, a voltage at the third terminal of the first switch remains at a high level, and the first switch remains in an off state.

* * * * *